United States Patent [19]

Buras, Jr. et al.

[11] Patent Number: 5,559,672
[45] Date of Patent: Sep. 24, 1996

[54] DOOR APPARATUS FOR A PORTABLE COMPUTER

[75] Inventors: Kenneth J. Buras, Jr., Houston; Neil L. Condra, The Woodlands, both of Tex.

[73] Assignee: Compaq Computer Corporation, Houston, Tex.

[21] Appl. No.: 349,400

[22] Filed: Dec. 5, 1994

[51] Int. Cl.⁶ ........................................ H05K 7/14
[52] U.S. Cl. .................. 361/684; 439/928.1; 361/737
[58] Field of Search ........................... 361/683–686,
361/737; 312/9.2, 9.15, 9.22, 9.28, 270.2,
223.1, 223.2, 362; 439/928.1

[56] References Cited

U.S. PATENT DOCUMENTS 4,774,399  9/1988  Fujita et al. .................... 235/441
5,299,089  3/1994  Lwee ............................. 361/684

*Primary Examiner*—Bot L. Ledynh
*Assistant Examiner*—Jayprakash N. Gandhi
*Attorney, Agent, or Firm*—Konneker & Smith

[57] ABSTRACT

A door apparatus for a portable computer memory card international association (PCMCIA) aperture formed in a surface of a portable computer having a molded housing structure. The aperture has opposing edges and is configured to receive a PCMCIA card therethrough. The door apparatus includes a first and second doors having inner and outer sides. The outer sides are hingedly coupled via journal members and bearing supports to the opposing edges of the aperture to separately rotate between a closed position wherein the inner sides of the first and second doors are adjacent to one another and an open position wherein the inner sides of the first and second doors are rotated in opposing directions when a PCMCIA card is inserted through the aperture. The door apparatus further includes a biasing member coupled to the first and second doors to thereby pivotally rotate the first and second doors toward the closed position when the PCMCIA card is removed from the aperture. The width of the doors is such that they do not contact a PCMCIA guide/ejector that is positioned adjacent the PCMCIA aperture.

7 Claims, 2 Drawing Sheets

DOOR APPARATUS FOR A PORTABLE COMPUTER

BACKGROUND OF THE INVENTION

1. Field of the Invention

The present invention generally relates to a door apparatus for an aperture formed in a portable computer's surface, and more specifically relates to a door apparatus for a PCMCIA aperture formed in a portable computer's surface.

2. Description of Related Art

The use of and advantages associated with portable computers are well known in the art. Over the last decade, there has been an intense effort in the computer industry to down size the personal computer ("PC") to provide users with a powerful yet portable computer that can be taken out of the office and fully utilized at home or on the road. As advancements have been made in both microprocessing chips and battery technologies, particularly over the last decade, PCs were eventually downsized into "laptop computers". While these computers offered the portability and processing power of a full sized PC, the laptop was still somewhat large and heavy for the user to carry around. In response to these disadvantages, the laptops were downsized even further into what is now known in the industry as a notebook computer, which is smaller and more light weight yet possessing equal or greater processing capabilities than their earlier laptop counterpart.

In order to achieve a useful portable computer in the size of the notebook computers presently known in the art, many design processing and space saving changes occurred both in the electronics portion of the computer and in the exterior design. However, while the size of these portable computers has decreased, the expectations of the user with respect to the processing capacity and interfacing capabilities have expanded. Thus, to accommodate this expanding need for a "super" portable computer, portable computer memory card international association ("PCMCIA") cards were developed. These PCMCIA cards allow the user to temporarily expand the processing or interfacing capabilities of a portable computer with the insertion of a single card into the computer and interfacing it with the motherboard in the computer. Several different types of PCMCIA cards, which allow the user to increase the RAM processing memory of the portable computer or interface it with everything from a Local Area Networks ("LAN") system to a modem, are now commercially available and extensively used.

To accommodate the use of these cards, portable computer manufactures designed internal PCMCIA ports or apertures in the portable computer. However, due to the restricted space requirements, many such designs do not provide for a covering member over the aperture. This, of course, allows debris to enter the system and increase the probability of damage to the internal components of the computer. To overcome these problems, some manufactures, however, provide a single, hinged external door member that opens outwardly from the portable computer housing and covers the aperture when in a closed position. While these external doors do prevent debris from entering the portable computer when in the closed position, they are very susceptible to breakage when in the open position because they extend outwardly from the computer housing. In addition, they interfere with the insertion of the PCMCIA card into the PCMCIA port or aperture.

A type of door apparatus that is associated with the floppy disk drive and that swings into the computer housing is well known. This door apparatus typically consists of a single door member that is supported from the floppy disk drive frame member. In such instances, the frame is designed to accommodate a clearance path for the width of the floppy disk drive door. While these mechanisms work well for the floppy disk drive, they are not desirable for a PCMCIA card application because of the amount of additional space required for the frame member to which the door would be mounted. Moreover, in many instances, more than one PCMCIA card may be used at any given time. Thus, the conventional floppy disk door member would have to be wider, which would, of course, undesirably consume more precious space within the portable computer.

Therefore, it can readily be seen that there is a need in the art for a door apparatus that effectively covers a PCMCIA aperture, that is not susceptible to breakage and that does not require additional space within the portable computer. The present invention provides a door apparatus that addresses these deficiencies.

SUMMARY OF THE INVENTION

In carrying out principles of the present invention, in accordance with a preferred embodiment thereof, there is provided a door apparatus for a portable computer memory card international association (PCMCIA) aperture formed in a surface of a portable computer having a molded housing structure wherein the aperture has opposing edges and is configured to receive a PCMCIA card therethrough. The door apparatus comprises first and second doors having inner and outer sides. The outer sides of the doors are hingedly coupled to the opposing edges of the aperture to separately rotate the doors between a closed position where the inner sides of the first and second doors are adjacent to one another and an open position where the inner sides of the first and second doors are rotated inwardly into the molded housing structure in opposing directions when the PCMCIA card is inserted through the aperture. The door apparatus also includes a biasing means coupled to each of the first and second doors that rotate the doors toward the closed position when the inserted PCMCIA card is removed from the aperture.

In another embodiment, the housing structure contains a PCMCIA guide/ejector positioned a distance from the aperture. The first and second doors each have a width from the inner side to the outer side that is less than the distance of the PCMCIA guide/ejector such that the first and second doors may be rotated to the open position without contacting the PCMCIA guide/ejector. Additionally, the width of the first door is sufficient to cover about a first half of the aperture, and the second door is sufficient to cover about a second half of the aperture.

In yet another embodiment, each of the first and second doors are hingedly coupled to the opposing edges of the aperture by a journal member. Preferably, each of the first and second doors are hingedly coupled to the opposing edges of the aperture by a plurality of journal members, and more preferably, the plurality of journal members are integrally formed on the outer edges of the first and second doors.

In yet another aspect of the present invention, the door apparatus further comprises bearing supports coupled to the opposing edges of the aperture to hingedly hold the journal members coupled to each of the outer edges of the first and second doors. Preferably, the bearing supports are integrally formed from the molded housing structure and more preferably, the bearing supports have notches formed therein to frictionally engage and hingedly hold the journal members. In another aspect of this same embodiment, a plurality of journal members may be coupled to each of the outer edges of the first and second doors, and the biasing means are spring members coupled to one of the plurality of the journal members on each of the first and second doors, to thereby individually rotate the first and second doors to the closed position when the PCMCIA card is removed from the aperture.

In yet another embodiment of the present invention, there is provided a portable computer comprising a molded housing structure with a portable computer memory card international association (PCMCIA) aperture having opposing edges configured to receive a PCMCIA card therein and formed in a surface of the portable computer. The PCMCIA guide/ejector is contained within the molded housing structure adjacent the aperture and adapted to receive a PCMCIA card inserted through the aperture. The guide/ejector is electrically connected to a motherboard contained within the housing structure. Preferably, the PCMCIA guide/ejector is comprised of a plurality of vertically stacked PCMCIA guide/ejectors each adapted to receive a PCMCIA card therein. The plurality of vertically stacked PCMCIA guide/ejectors are aligned with the aperture to receive a PCMCIA card that is inserted in the aperture.

In another aspect of this same embodiment, a door apparatus is also included. The door apparatus comprises first and second doors having inner and outer sides. The outer sides are hingedly coupled to the opposing edges of the aperture to separately rotate between a closed position wherein the inner sides of the first and second doors are adjacent to one another and an open position wherein the inner sides of the first and second doors are rotated in opposing directions when the PCMCIA card is inserted through the aperture. The door apparatus further comprises a biasing means coupled to the first and second doors to thereby pivotally rotate the first and second doors toward the closed position when the PCMCIA card is removed from the aperture. Preferably, the biasing means are spring members that are coupled to one of the plurality of the journal members on each of the first and second doors to rotate the first and second doors to the closed position when a PCMCIA card is removed from the aperture.

The PCMCIA guide/ejector may be positioned a distance from the aperture and the first and second doors may each have a width from the inner side to the outer side that is less than the distance of the PCMCIA guide/ejector for the aperture. Moreover, the first door has a width between the inner and outer sides of the first door that is sufficient to cover about a first half of the aperture when the first door is in the closed position, and the second door has a width between the inner and outer sides of the second door sufficient to cover about a second half of the aperture when the second door is in the closed position. Accordingly, the first and second doors may be rotated to the open position without contacting the PCMCIA guide/ejector when a PCMCIA card is inserted in the aperture.

Preferably, the first and second doors are hingedly coupled to the opposing edges of the aperture by a journal member that is integrally formed on the outer edges of the first and second doors and that is coupled to the each of the outer edges of the first and second doors, and more preferably, the first and second doors are hingedly coupled to the opposing edges of the aperture by a plurality of journal members.

In another aspect of the present invention, the portable computer further comprises bearing supports coupled to the opposing edges of the aperture to hingedly hold the journal member that is coupled to each of the outer edges of the first and second doors. The bearing supports are preferably integrally formed in the molded housing structure and have notches formed therein to frictionally engage and hingedly support and hold the journal members.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
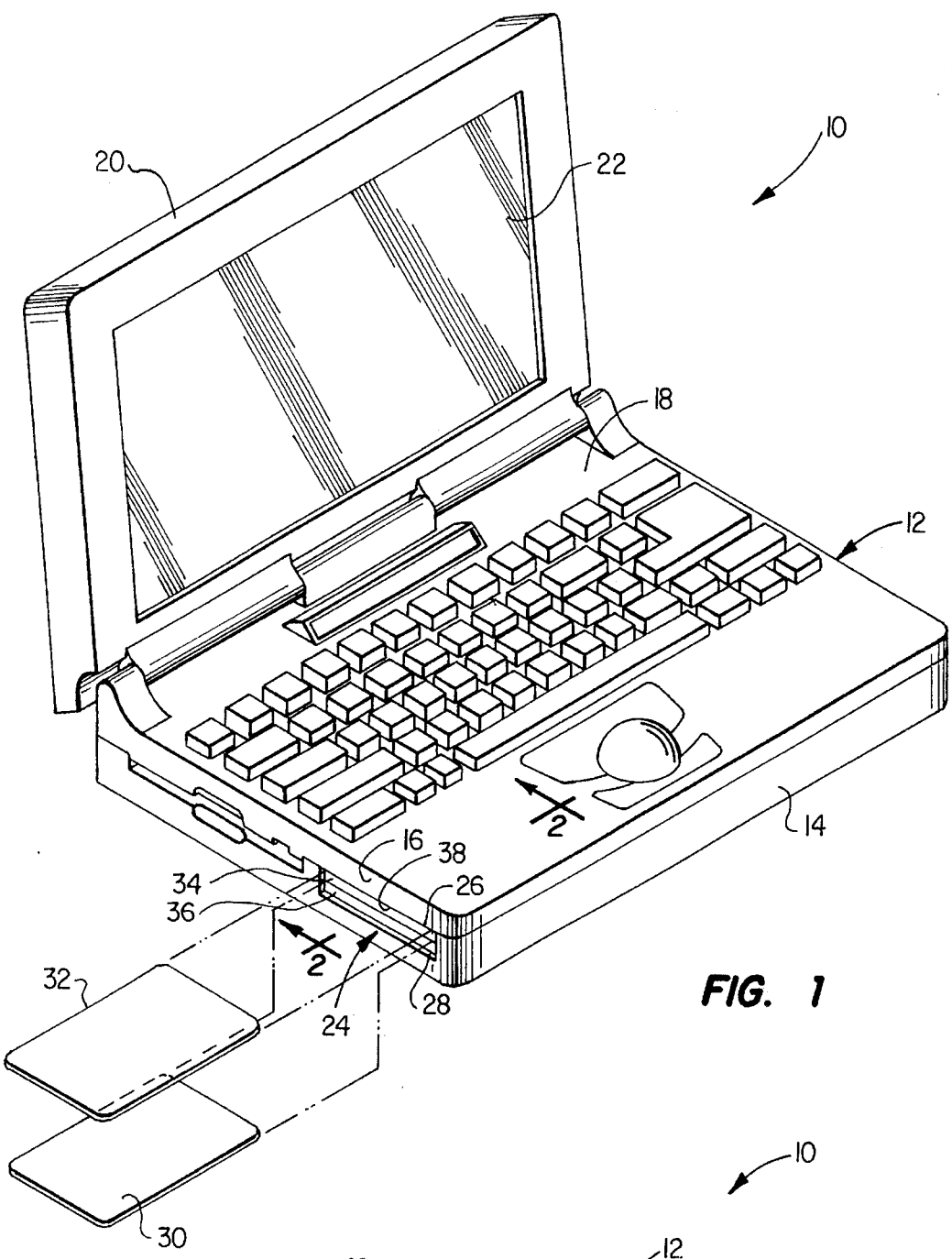
FIG. 1 illustrates a perspective view of a portable computer of the present invention having a PCMCIA aperture formed in the housing structure adapted to receive PCMCIA cards therein.

Referring initially to FIG. 1, in a preferred embodiment thereof, the present invention provides a portable computer 10 having a molded housing structure 12 with a front end portion 14, a surface 16 and a rear end portion 18. Preferably, the molded housing structure 12 is comprised of a hard plastic material conventionally used in the manufacture of computer housing. A lid member 20 having a screen portion 22 therein is pivotally attached to the portable computer 10 at the rear end portion 18. Formed in the surface 16 is a portable computer memory card international association ("PCMCIA") aperture 24 having opposing edges 26,28. The aperture 24 is configured to receive therein at least one PCMCIA card 30, however, the aperture 24 may also be adapted to receive a plurality of PCMCIA cards 30,32. As used herein, the phrase PCMCIA card means any card that can be inserted into a PCMCIA port for expanding the computers processing, storing or interfacing capabilities. For example, a PCMCIA card may be a, a PCMCIA memory card, a PCMCIA LAN interface card, a PCMCIA remote C/D ROM drive card, a PCMCIA fax card, a PCMCIA modem card, a PCMCIA insertable hard disk drive or remote disk drive card or any other type of PCMCIA cards known in the art.

The PCMCIA aperture 24 is covered by pivotable first and second doors 34,36 that substantially cover the PCMCIA aperture 24. What is meant by "substantially" is that the widths of the first and second doors 34,36, when taken together, are sufficient to cover the entire PCMCIA aperture 24 with the exception of a small clearance gap 38 that exists between when the first and second doors 34,36 are in the closed position.

Figure 2:
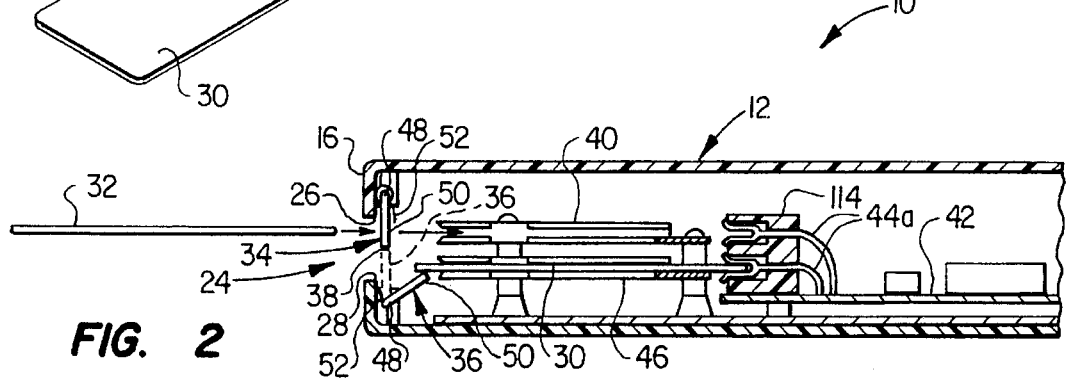
FIG. 2 illustrates a cross-sectional view of FIG. 1 taken along the line 2—2 in which the PCMCIA guide/ejector is comprised of a plurality of vertically stacked PCMCIA guide/ejectors adapted to receive a plurality of PCMCIA cards therein.
Figure 3:
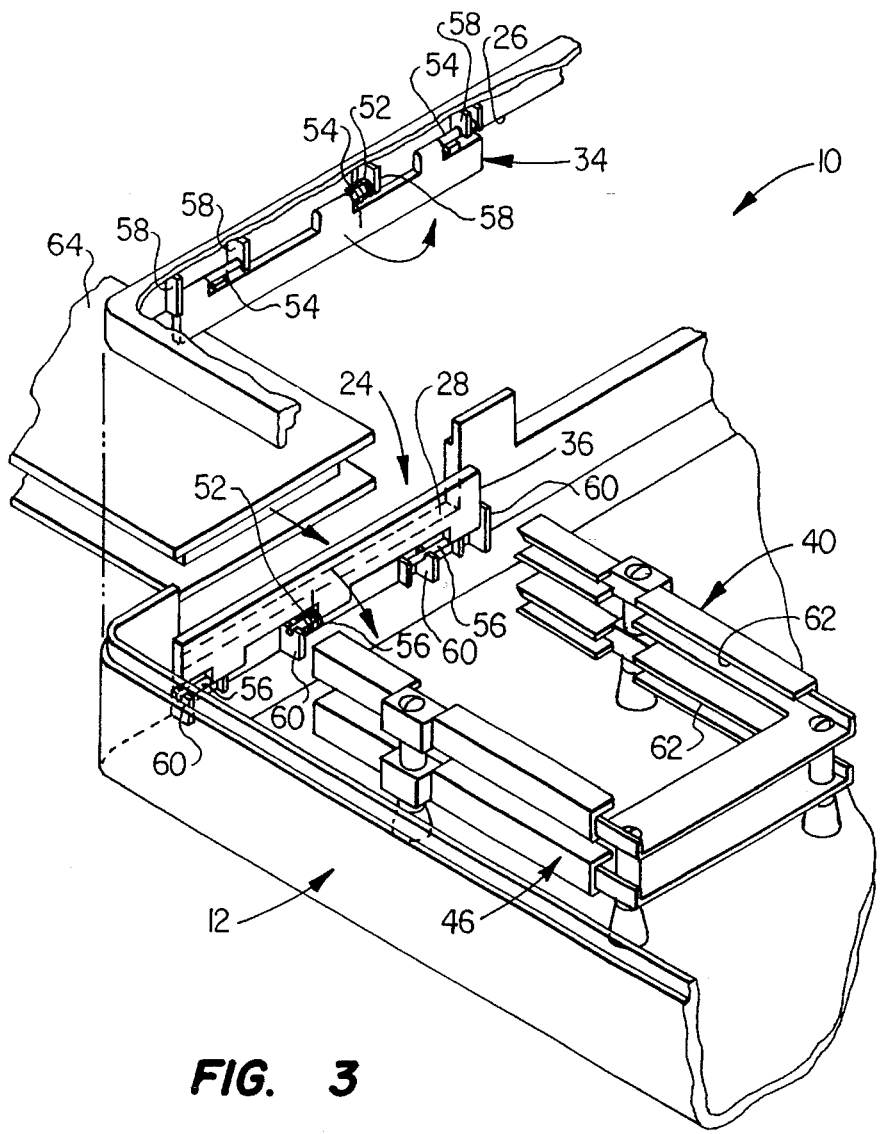
FIG. 3 illustrates a partial exploded view of the first and second doors hingedly coupled to opposing edges of the PCMCIA aperture.
Figure 4:
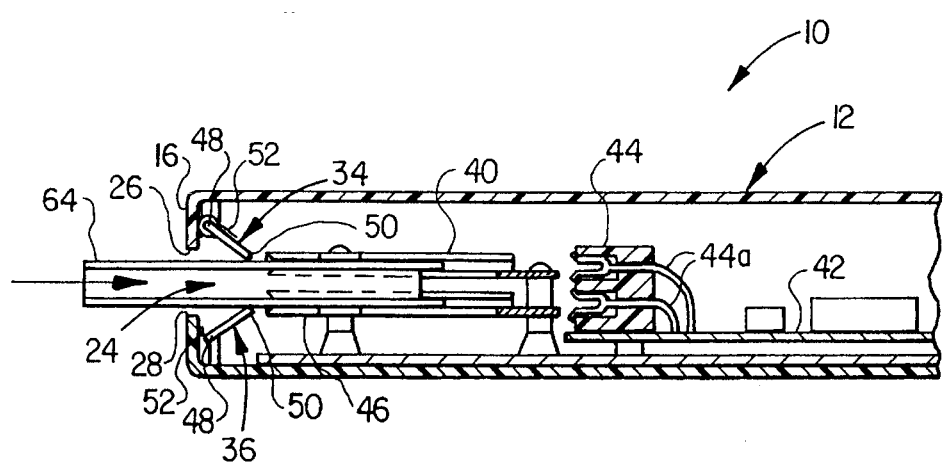
FIG. 4 illustrates a cross-sectional view wherein the PCMCIA guide/ejector is comprised of a plurality of vertically stacked PCMCIA guide/ejectors adapted to receive therein a single PCMCIA card having a substantial thickness.

Turning now to FIG. 2, there is illustrated a cross-sectional view of the molded housing structure 12. Preferably, the molded housing structure 12 contains therein a PCMCIA guide/ejector 40 that is electrically connected to a motherboard 42 within the molded housing structure 12 by a PCMCIA connector means 44. The connector means 44 has electrical contacts 44a that are adapted to receive a PCMCIA card 30, to thereby electrically connect the PCMCIA card 30 to the motherboard 42. The PCMCIA guide/ejector 40 is configured to guide the PCMCIA card 30 into the connector means 44 and is also configured to eject the PCMCIA card 30, by conventional mechanical levered means (not shown), to thereby remove the PCMCIA card 30 from the portable computer 10. Preferably, a plurality of PCMCIA guide/ejectors 40,46 are vertically stacked to receive either a plurality of thinner PCMCIA cards 30,32 (i.e., cards that have a thickness configured to be inserted into one PCMCIA guide/ejector) or a single PCMCIA card having a thickness configured to be inserted simultaneously into both of the vertically stacked PCMCIA guide/ejectors 40,46 as illustrated in FIGS. 3 & 4, and as discussed below.

The first and second doors 34,36 each have inner and outer sides 48,50 and are hingedly coupled to an interior surface of the surface 16 at opposing edges 26,28 of the PCMCIA aperture 24 in a manner later described below. The first door 34 has a width that is sufficient to cover a first half of the PCMCIA aperture 24, and the second door 36 has a width that is sufficient to cover a second half of the PCMCIA aperture 24. However, the widths of the first and second doors 34,36 are less than the distance of the PCMCIA guide/ejector 40 from the PCMCIA aperture 24 such that neither the first nor second doors 34,36 contact the PCMCIA guide/ejector 40 as the first or second doors 34,36 are rotated between the closed and open positions. The widths of the first and second doors 34,36 also provide for a small clearance gap 38 between the inner sides 50 of the doors when they are in the closed position (second door 36 in closed position is illustrated in phantom), to thereby allow the doors to freely rotate to the closed position without contacting each other.

The position and the widths of the first and second doors 34,36 provide advantages not found in the prior art devices discussed above. For instance, the preferred interior position of the doors conveniently protects the doors from breakage when not in use, and the fact that the doors are rotated inwardly into the molded housing structure 12 when a PCMCIA card in inserted therein 12 prevents the doors from being susceptible to the possibility of breakage that is present in the prior art doors that open outwardly from the housing structure. It should be specifically understood, of course, that the doors could be hinged on the exterior side of the opposing edges 26,28 to rotate inwardly into the molded housing structure 12, if so desired.

Additionally, the widths of the doors are such that they allow for maximization of space within the molded housing structure 12 because the PCMCIA guide/ejectors 40,46 may be positioned closer to the PCMCIA aperture 24, thereby leaving more room for other internal components.

In those instances where the PCMCIA guide/ejectors 40,46 are vertically stacked, the first door 34, which is biased in a closed position by a biasing means 52 is aligned with the upper PCMCIA guide/ejector 40 such that when the first PCMCIA card 32 is inserted through the PCMCIA aperture 24, the first door 34 is rotated to an open position to thereby allow the first PCMCIA card 32 to be inserted in the upper PCMCIA guide/ejector 40. In addition, the second door 36, which is also biased in a closed position by a biasing means 52 is aligned with the lower PCMCIA guide/ejector 46 such that when the second PCMCIA card 30 is inserted through the PCMCIA aperture, the second door 36 is rotated to an open position, to thereby allow the second PCMCIA card 30 to be inserted in the lower PCMCIA guide/ejector 46, as illustrated.

Turning now to FIG. 3. there is illustrated a partial exploded view of molded housing structure 12 and the door apparatus of the present invention. As previously discussed, the first and second doors 34,36 are hingedly coupled to the opposing edges 26,28 of the PCMCIA aperture 24. Preferably, however, the first and second doors 34,36 are hingedly coupled to the opposing edges 26,28 by journal members 54,56 coupled to each one of the first and second doors 34,36. The journal members 54,56 may be a single pin member that hingedly couples the door to the opposing edge, or the journal members 54,56 may be a plurality of journal members integrally formed on the outer sides 50 of each respective door, as shown in FIG. 3. The journal members 54,56 are hingedly held by bearing supports 58,60. Preferably, bearing supports 58,60 are integrally formed in the interior portion of the molded housing structure 12 adjacent the opposing edges 26,28. The biasing means 52 that rotate the first and second doors 34,36 to the closed position are preferably resilient springs coupled to one of the plurality of journal members 54,56.

Because the bearing supports 58,60 are integrally formed from the molded housing structure 12, there is no need for additional frame members as is conventionally done with respect to floppy disk drives. Thus, additional internal computer space is saved, which is yet another advantage offered by the present invention.

Continuing to refer to FIG. 3, a simplified view of the PCMCIA guide/ejectors 40,46 are illustrated. The PCMCIA guide/ejector 40 may be of conventional having guiding tracks 62 for aligning and guiding the PCMCIA card 64 in the proper orientation with respect to the PCMCIA guide/ejectors 40,46. A mechanical ejector mechanism (not shown) is also included in the design of the PCMCIA guide/ejectors 40,46. The ejector mechanism is typically activated by depression of a button (not shown) located on the surface of the portable computer 10 adjacent the PCMCIA aperture 24. When the button is depressed, the ejector mechanism overcomes the insertion force of the connector means 44 (see FIGS. 2 & 4) and ejects the PCMCIA card 64 from the PCMCIA guide/ejector 40,46. As previously discussed, a plurality of PCMCIA guide/ejectors 40,46 may be vertically stacked thereby providing for the insertion of more than one thinner PCMCIA card or providing for a thicker PCMCIA card 64, as illustrated in FIG. 3. The thicker PCMCIA card 64 may be designed to be guided by the plurality of guiding tracks 62 in the vertically stacked PCMCIA guide/ejectors 40,46.

Referring briefly now to FIG. 4, the thicker PCMCIA card 64 is illustrated being inserted through the PCMCIA aperture 24 and into the vertically stacked PCMCIA guide/ejectors. When the thicker PCMCIA card 64 is inserted through the PCMCIA aperture 24, both the first and second doors 34,36 are simultaneously rotated to the open position by the PCMCIA card 64 as illustrated.

From the foregoing, it is apparent that the present invention provides a door apparatus for a portable computer memory card international association (PCMCIA) aperture formed in a surface of a portable computer wherein the aperture has opposing edges and is configured to receive a PCMCIA card therethrough. The door apparatus includes first and second doors having inner and outer sides. The outer sides are hingedly coupled via journal members and bearing supports to the opposing edges of the aperture to separately rotate the doors between a closed position and an open position. In the closed position, the inner sides of the first and second doors are adjacent to one another and in the open position, the inner sides of the first and second doors are rotated in opposing directions when a PCMCIA card is inserted through the aperture.

The door apparatus further includes a biasing means coupled to the first and second doors to thereby pivotally rotate the first and second doors toward the closed position when the PCMCIA card is removed from the aperture. The width of the doors is such that they do not contact a PCMCIA guide/ejector that is positioned adjacent the PCMCIA aperture.

Although the present invention and its advantages have been described in detail, it should be understood that various changes, substitutions and alterations can be made herein without departing from the spirit and scope of the invention as defined by the appended claims.

What is claimed is:

1. A computer comprising:
  a housing having an exterior wall through which an opening extends into the interior of said housing, said opening being partially bounded by first and second opposing edge portions of said exterior wall and being configured to permit at least one memory card to be inserted therethrough into the interior of said housing;
  a printed circuit board disposed within the interior of said housing;
  a guide/ejector structure disposed within the interior of said housing and being operative to releasable receive each inserted memory card and electrically couple it to said printed circuit board; and
  memory card opening door apparatus including (1) first and second door members each having opposite first and second edge portions, (2) mounting means for securing said first edge portions of said first and second door members to said first and second opposing edge portions of said opening in a manner permitting said first and second door members to be pivoted relative to said exterior wall between a closed position in which said first and second door members are generally parallel to one another and to said exterior wall, with each of said first and second door members blocking approximately half of said opening, and an open position in which said first and second door members are swung inwardly into the interior of said housing, and (2) spring means for resiliently biasing said first and second door members toward said closed position thereof, said mounting means including:
    spaced first and second pluralities of transverse support plate members integrally formed on inner side portions of said first and second opposing edge portions of said exterior wall and having side edge depressions formed thereon, and
    spaced first and second pluralities of side edge tab members integrally formed on said first edge portions of said first and second door members, each of said tab members having integrally formed thereon a journal member, said journal members being aligned with and rotatably snapped into said corresponding ones of said side edge depressions of said first and second pluralities of transverse support plate members in a manner permitting said first and second door members to be selectively pivoted between said open and closed positions thereof.

2. The computer of claim 1 wherein said computer is a notebook computer.

3. The computer of claim 1 wherein said housing, said first and second spaced pluralities of support plate members, and said first and second door members are of a molded plastic construction.

4. The computer of claim 1 wherein:
  said side edge depressions in said first spaced plurality of transverse support plate members are in a spaced apart, facing and aligned relationship with said side edge depressions in said second spaced plurality of transverse support plate members.

5. The computer of claim 1 wherein:
  said spaced first and second pluralities of transverse support plate members are respectively interdigitated with said spaced first and second pluralities of side edge tab members.

6. The computer of claim 1 wherein:
  said guide/ejector structure is operative to releasably receive at least one PCMCIA card, and
  said opening is configured to permit insertion therethrough of at least one PCMCIA card.

7. The computer of claim 6 wherein:
  said printed circuit board is a computer motherboard.

* * * * *